United States Patent [19]

Steinschulte

[11] Patent Number: 4,654,623

[45] Date of Patent: Mar. 31, 1987

[54] THERMOMETER PROBE FOR MEASURING THE TEMPERATURE IN LOW-CONVECTION MEDIA

[75] Inventor: Werner Steinschulte, Berlin, Fed. Rep. of Germany

[73] Assignee: Naturliche Familien-Planung (NFP) GmbH, Berlin, Fed. Rep. of Germany

[21] Appl. No.: 680,904

[22] Filed: Dec. 12, 1984

[30] Foreign Application Priority Data

Dec. 20, 1983 [DE] Fed. Rep. of Germany ....... 3346565

[51] Int. Cl.⁴ .............................................. H01C 3/04
[52] U.S. Cl. ....................................... 338/28; 338/30; 324/149
[58] Field of Search ......................... 338/26, 25, 28, 30; 374/165, 185; 324/149

[56] References Cited

U.S. PATENT DOCUMENTS 2,866,060 12/1958 Barthel et al. ........................ 338/26
4,560,973 12/1985 Grimm et al. ........................ 338/28

*Primary Examiner*—E. A. Goldberg
*Assistant Examiner*—M. M. Lateef
*Attorney, Agent, or Firm*—Basile, Weintraub & Hanlon

[57] ABSTRACT

A thermometer probe or pyrometer for measuring the temperature in low-convection media is disclosed, which has a temperature-dependent resistor, a receiving sleeve which receives the resistor and a holding device. The resistor is covered by heat conducting material. The receiving sleeve is constructed as an elongated, thin-walled, tubular sleeve of poor heat conducting material and surrounds an elongated air chamber, through which are passed the leads to the temperature-dependent resistor.

9 Claims, 2 Drawing Figures

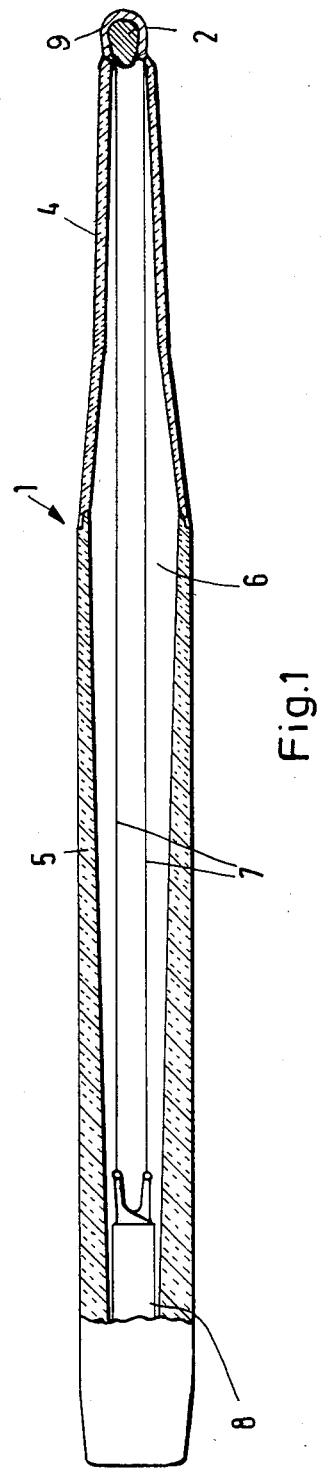
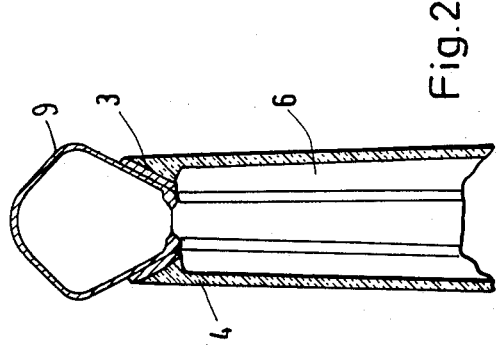

THERMOMETER PROBE FOR MEASURING THE TEMPERATURE IN LOW-CONVECTION MEDIA

BACKGROUND OF THE INVENTION

I. Field of the Invention

The invention relates to a thermometer probe or pyrometer for measuring the temperature in low-convection media.

II. Description of the Prior Art

Thermometer probes are known in which a temperature-dependent resistor, e.g. a thermistor, is integrally cast in a steel sleeve. The steel sleeve is connected to a holding device and the resistor connections are connected to an evaluation circuit. To permit accurate measurement of the temperature, the steel sleeve and, optionally, the holding device must assume the temperature of the medium whose temperature is to be measured. The thermal energy necessary for this ordinarily derived from the surrounding medium. This causes localized cooling. To compensate for this localized cooling, heat is taken from the more remote areas of the medium. This process occurs rapidly in media with strong convection properties allowing relatively rapid temperature measurement with the prior art thermometer probe. However, in low-convection or convection-free media, temperature compensation between the probe and the medium takes place very slowly, so that an accurate temperature measurement is very time-consuming. Where such long measuring periods are required, continuous heat transfer through the holding device and the connecting cables can result in erroneous readings. Similarly, the test current can generate enough heat due to resistance encountered in the circuit to introduce errors due to heating of the electrode.

SUMMARY OF THE INVENTION

The present invention provides a thermometer probe or pyrometer permitting a fast and rapid temperature measurement in low-convection media.

The thermometer probe of the present invention has a temperature-dependent thermistor covered with a highly conductive material. The thermistor is connected to one end of an elongated, sleeve-like receiving member. The other end of the sleeve-like member is connected to a holding device in the form of a grip. The sleeve-like receiving member defines an elongated air chamber through which leads connecting the thermistor to a cable pass. While the thermistor is covered with a highly heat-conductive material, the walls of the holding device and receiving member are constructed of poor heat-conducting material.

Because probe elements which are not located directly between the thermistor and the medium to be measured are constructed as poor heat conductors, conveyance of the thermal energy absorbed by the thermistor and its sheathing is extremely difficult. The small mass of the thermistor makes rapid temperature compensation between the medium to be measured and the thermistor possible. An air chamber located behind the thermistor, and surrounded by the thin, poorly heat conducting wall stops heat flow as a result of the air insulation.

The extremely thin layer of very good heat conducting material, positioned between the thermistor and the medium, permits rapid thermal compensation between the medium to be measured and the thermistor. Because the leads to the thermistor are very thin and are passed through the air chamber with a considerable length, only a very small heat quantity which can effect temperature of the media is removed via the leads.

BRIEF DESCRIPTION OF THE DRAWINGS

The invention is described in greater detail hereinafter, relative to non-limitative embodiments and the attached drawings, wherein show:

FIG. 1 is a section through the thermometer probe according to the invention; and FIG. 2 is a cross-sectional, detailed drawing of the thermistor in one end of the receiving sleeve.

DETAILED DESCRIPTION OF THE PREFERRED EMBODIMENTS

In the pyrometer or thermometer probe 1 shown in FIG. 1, the temperature-dependent sensor comprises a thermistor 2, which has a rounded-off or drop shape. Thermistor 2 is sheathed in a highly conductive epoxy resin 9. As shown in FIG. 2, theremistor 2 is attached to the end of a sleeve-like receiving member 4 by means of a highly conductive epoxy resin adhesive 3.

Alternately, the thermistor 2 may be integrally positioned in a thin metal cap made from aluminum or a copper or silver alloy with a highly conductive, special epoxy resin, such that the cap just covers the thermistor. The cap is connected to the end of receiving sleeve 4.

Receiving sleeve 4 is made from a material having poor heat conductivity, such as polystyrene. The receiving sleeve 4 is tubular having a thin-walled construction. The receiving sleeve 4 passes into a holding device or grip 5 also made from a poorly conductive material. The walls of the grip 5 can be somewhat thicker than the walls of sleeve 4 because the grip 5 is farther from thermistor 2. An air chamber 6 is provided within the receiving sleeve 4 and grip 5 to prevent heat flow from thermistor 2 to other parts of the thermometer probe. The leads 7 to thermistor 2 are constructed as thin wires with a diameter of approximately 0.2 mm. The leads 7 pass through the air chamber 6 defined by receiving sleeve 4 and grip 5 and are connected to a cable 8 projecting into grip 5. The cable leads to a measuring instrument (not shown). In the preferred embodiment, the leads 7 are approximately 80 mm in length. The thermistor shown in FIG. 2 has a width between 1.8 and 2.4 mm and a length between 2 and 2.8 mm.

In the thermometer probe of the present invention, all materials located directly between thermistor 2 and the medium to be measured are constructed of material which is highly heat conductive, so that the necessary heat transfer between medium and sensor takes place as rapidly as possible. The mass of the thermistor and that of the highly conductive material surrounding it are as low as possible to minimize the heat capacity of the part of the probe which must be brought to ambient temperature. This permits a minimum of heat to be taken from the ambient medium. All materials of probe 1 not forming the separating layer between thermistor 2 and the medium are constructed from material having poor heat conducting properties. This minimizes the quantity of heat taken from the medium and minimizes unnecessary and undesirable heat transfer through the holding device.

What is claimed is:

1. A thermometer probe for measuring temperature in a low convection medium, comprising:

a temperature dependent thermistor;

a thin layer of a highly heat-conductive material covering the thermistor and exposed to a low convection medium;

an elongated, thin-walled receiving member having a first end and a second end, the receiving member constructed from a material having poor heat-conducting properties and bonded to the thermistor at the first end with the thermistor disposed externally from the receiving member;

a hollow holding device constructed from a material having poor heat-conducting properties and connected to the second end of the receiving member;

an elongated continuous air chamber formed in the receiving member and the holding device extending from the thermistor through the holding device; and a plurality of leads passing through the elongated air chamber in contact with air in the chamber and connected to the thermistor.

2. The thermometer probe of claim 1, wherein the receiving member is an elongated, thin-walled, tubular sleeve.

3. The thermometer probe of claim 2, wherein the wall of the receiving member is approximately 0.2 mm.

4. The thermometer probe of claim 1, wherein the highly heat conductive material covers the temperature-dependent thermistor in a layer between about 0.02 mm and about 0.2 mm thick.

5. The thermometer probe according to claim 4, wherein the highly heat conductive material is selected from the group consisting of epoxy resins, metal-doped plastics, copper alloys and aluminum.

6. The thermometer probe according to claim 2, wherein the holding device is a hollow grip which receives the second end of the receiving member to continue the air chamber formed by the receiving member through which the leads are passed, the holding device being constructed from a material having poor heat conducting properties.

7. The thermometer probe of claim 2, wherein the thermistor is bonded to the first end of the receiving member with a highly heat-conductive adhesive.

8. The thermometer probe of claim 1, wherein the leads have a diameter of approximately 0.2 mm.

9. The thermometer probe of claim 1, wherein the temperature-dependent thermistor is integrally cast into a thin metal cap.

* * * * *

UNITED STATES PATENT AND TRADEMARK OFFICE
CERTIFICATE OF CORRECTION

PATENT NO. : 4,654,623

DATED : March 31, 1987

INVENTOR(S) : Werner Steinschulte

It is certified that error appears in the above-identified patent and that said Letters Patent is hereby corrected as shown below:

Column 1, line 19, after "ordinarily" insert -- is --.

Signed and Sealed this

Nineteenth Day of January, 1988

Attest:

DONALD J. QUIGG

Attesting Officer

Commissioner of Patents and Trademarks